Figure 4:
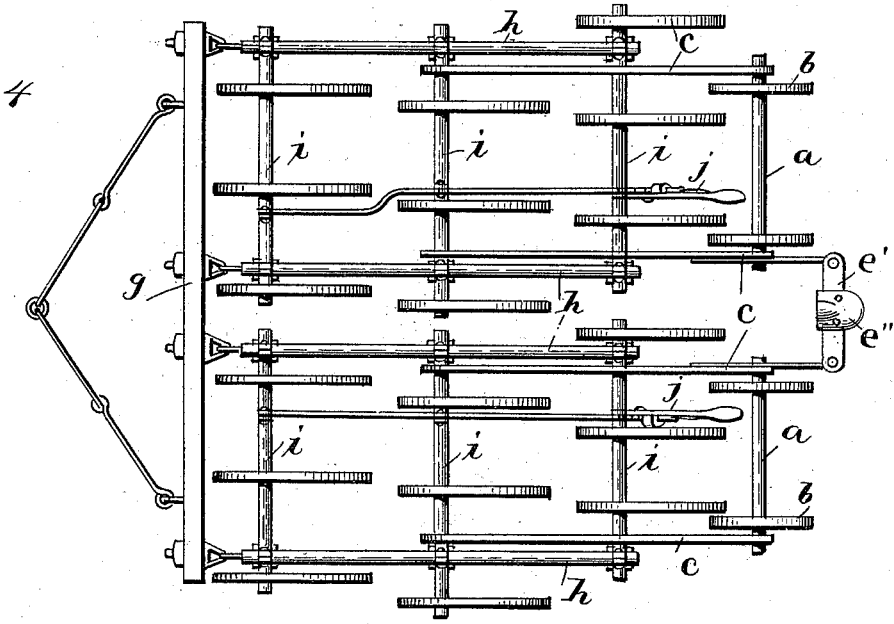

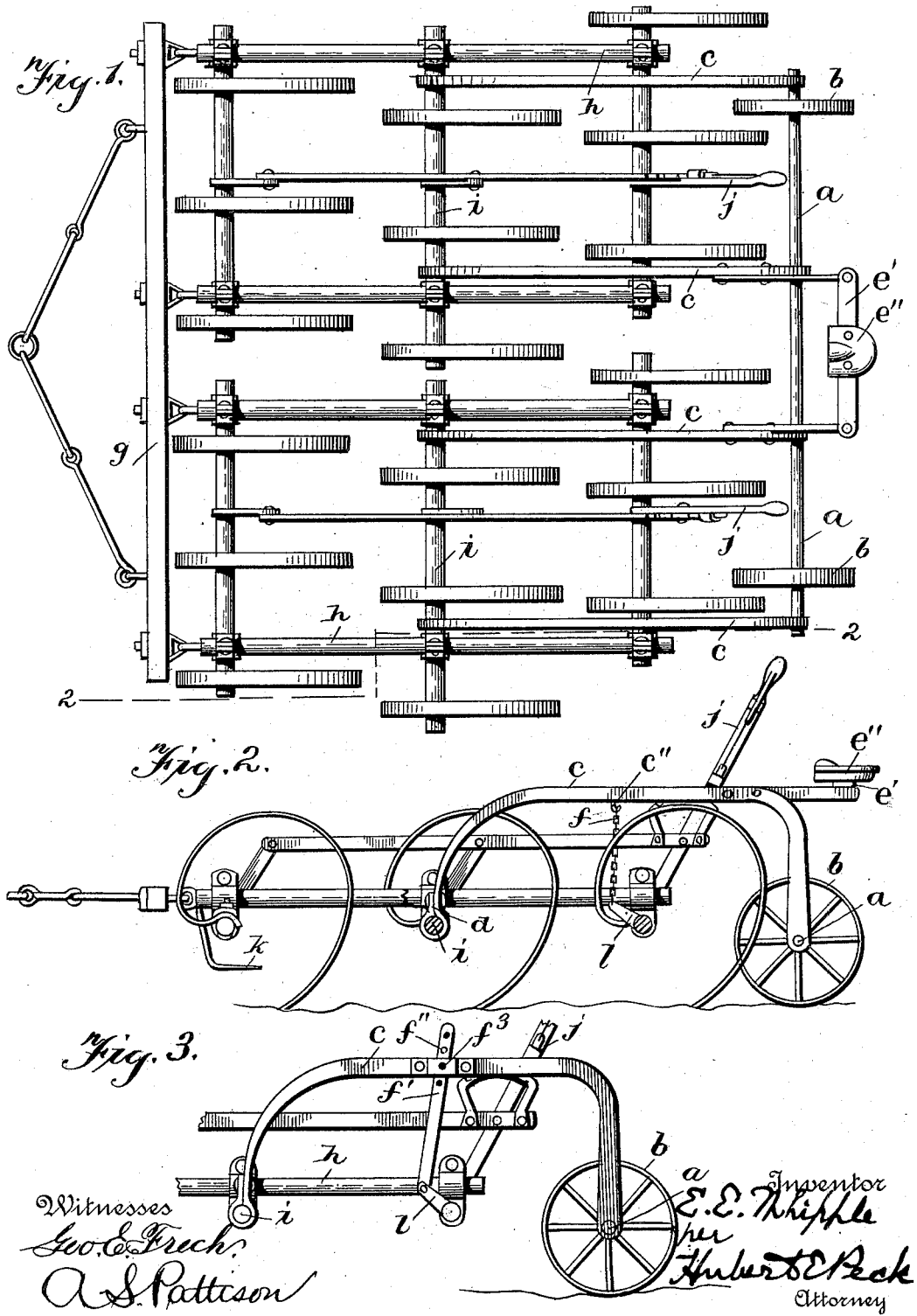

(No Model.) 2 Sheets—Sheet 2.

E. E. WHIPPLE.
SUPPORTING ATTACHMENT FOR HARROWS.

No. 600,663. Patented Mar. 15, 1898.

Witnesses
Geo. E. Frech.
A. S. Rittisen

Inventor
E. E. Whipple
per Hubert Peck
Attorney

UNITED STATES PATENT OFFICE.

EFFINGER E. WHIPPLE, OF COOPERSTOWN, NEW YORK.

SUPPORTING ATTACHMENT FOR HARROWS.

SPECIFICATION forming part of Letters Patent No. 600,663, dated March 15, 1898.

Application filed April 10, 1897. Serial No. 631,583. (No model.)

*To all whom it may concern:*

Be it known that I, EFFINGER E. WHIPPLE, a citizen of the United States, residing at Cooperstown, in the county of Otsego and State of New York, have invented certain new and useful Improvements in Supporting Attachments for Harrows and the Like; and I do hereby declare the following to be a full, clear, and exact description of the invention, such as will enable others skilled in the art to which it appertains to make and use the same.

This invention relates to certain improvements in wheeled supports for harrows and like implements.

Among other claims of novelty hereinafter pointed out and claimed I claim to be the first to have invented the combination of mechanical appliances for supporting in an elevated plane above the ground a curved-spring-tooth harrow operated by lever mechanism by means of a wheeled attachment with supporting and connecting mechanism whereby the frame of the harrow can be supported in a given horizontal plane above the ground when the teeth are in or out of operative engagement with the soil and at the same time leave the harrow free to move above the plane of the support without interfering with the operation of the wheeled or the riding attachment.

In the drawings one of the several ways which will accomplish the result already stated is illustrated.

The invention consists in certain novel features of construction and in combinations and in arrangements of parts, as more fully and particularly pointed out and described hereinafter.

Figure 5:
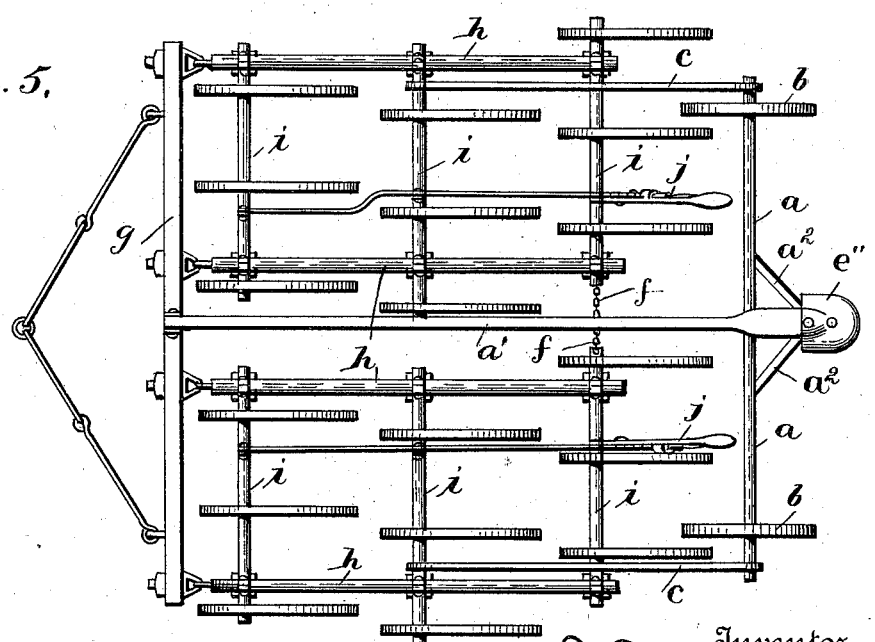

Referring to the accompanying drawings, Figure 1 is a plan view of any ordinary lever-adjustment harrow, showing one form of my improved attachment applied thereto, the teeth being shown down in operative adjustment. Fig. 2 is a section on line 2 2, Fig. 1, of a harrow provided with said example of a construction of attachment made in accordance with my present invention, the teeth being shown in operative adjustment. Fig. 3 is a detail side elevation showing part of a harrow and illustrating a bar depending from the sustaining-bar of the attachment to the harrow instead of the loose connection shown in the two previous views. Fig. 4 is a top plan of a two-section harrow provided with an attachment made in accordance with my invention wherein the sustaining-bars of each section have their own axle provided with two supporting-wheels, the seat being attached as shown in Fig. 2 and also the chains being employed as shown in said figure. Fig. 5 is a top plan of a two-section harrow having a supporting attachment built in accordance with my invention wherein a draft-tongue is employed and the two center sustaining-bars dispensed with.

In the drawings, $a$ is the horizontal axle of the attachment, having any desirable number of suitably-arranged supporting-wheels $b$ arranged thereon.

$c$ are sustaining-bars, at their lower rear ends suitably mounted on the axle and from thence extending upwardly and horizontally and forwardly for a suitable distance with their front ends deflected downwardly and provided with suitable attaching or coupling means, as $d$.

Certain adjacent sustaining-bars, preferably the two center bars, carry a suitable seat. The seat is supported by the two braces extending horizontally and rearwardly from the upper horizontal portions of the sustaining-bars and rigidly secured thereto. The rear ends of these braces have the cross-seat piece $e'$ rigidly secured thereto, which can form the seat or can be provided with an additional metal seat $e''$, the seat being preferably arranged a distance above and in rear of the supporting-axle of the attachment.

Each sustaining-bar $c$ is provided with a suitable supporting device or connection depending from a point intermediate the ends of the bar and usually from the highest point thereof.

In Fig. 2 the supporting connection is formed by a chain $f$, depending from a hook $c''$, rigid with the sustaining-bar, so that the chain or supporting connection can be varied in length by passing the hook through different links of the chain.

In Fig. 3 a bar $f'$, depending from the sustaining-bar and loosely and adjustably connected therewith, forms the supporting connection; but I do not wish to limit myself in this particular, as many variations and modified forms and arrangements of supporting connections can be provided for this purpose.

In Fig. 1 the attachment is shown adapted for and applied to a two-section lever-adjustment harrow, although the attachment is adapted for application to any kind of a lever-adjustment harrow or like implements of one or more sections.

In Fig. 1 the supporting-axle of the attachment is arranged in rear of and extending the full width of the two sections or approximately so, and said axle is shown provided with four sustaining-bars $c$, two for each section, arranged, respectively, at the opposite sides of each section. The front lower ends of the sustaining-bars are loosely coupled to any desirable part of the harrow, preferably in advance of the center of the length of the harrow. The sustaining-bars are shown loosely coupled to a center tooth-beam $i$; but my invention is not limited or restricted in this regard, as the sustaining-bars can be coupled, if the particular construction of the harrows renders it advisable, to the evener-bar $g$ or to the frame-bars $h$ or to the forward tooth-beam $i$.

The sustaining-bars are arranged between the teeth and between their ends are deflected upwardly, so as to extend such a distance above the harrow as to avoid interference with the working parts thereof and avoid the collection of trash, &c.

The supporting connections from the sustaining-bars depend to the rear ends of the sections and are loosely coupled to any desirable part of the harrow at the rear end thereof, and are so arranged that when the tooth-adjusting levers $j$ are thrown back and the teeth carried by the rocking tooth-beams are thrown down into operative digging position the rear end of the harrow will not be supported or carried by the attachment, and so that when the teeth are raised from the ground by the forward movement of the adjusting-levers the supporting connections will uphold the rear ends of the harrow from the ground, while the front of the harrow is carried by any suitable support, such as shoes $k$.

While the supporting connections can be loosely coupled to the frame or direct to the rear or other suitably-arranged bar, and my invention is not limited in this respect, yet I have shown the rear tooth-bar provided at each supporting connection with a forwardly-extending short arm $l$, rigid with the bar and to the outer portion of which the lower end of the supporting connection is secured loosely. Thus when the tooth-adjusting lever is thrown forward to raise the teeth said arm $l$ moves down, thereby tightening the supporting connection and directly or positively raising the rear end of the harrow on the supporting connections, and when the adjusting-lever is thrown back the arms $l$ raise and slacken the supporting connections as the teeth move down, thereby permitting the rear ends of the harrow-sections to drop to their normal operative positions.

When the teeth are down in operative position, the rear end of the harrow is not usually supported by the attachment, except when the harrow goes to the depth limited by the supporting connections. The harrow can be controlled and set to run any depth required by adjusting the supporting connections carrying the weight of the harrow on the supporting-wheels when the harrow attempts to work beyond that depth, avoiding the friction usually caused by the frame riding or running on the ground under such circumstances and supporting and carrying the frame in a given elevated horizontal plane above the ground. When the teeth are in operative position and not working their full depth, the harrow is free to rise and fall independently of the attachment.

Where the supporting attachment is formed by a bar, (see Fig. 3,) said bar passes up loosely through an opening in the sustaining-bar and is provided with a pin or stop $f''$ above the sustaining-bar and passed through one of a vertical series of openings in the supporting connection, so as to limit the down movement of the supporting-bar. If desired, the pin $f''$ can be passed through the opening $f^3$ in the sustaining-bar and through the supporting connection and thus hold the end of the harrow positively down to its work by throwing the weight of the attachment thereon. The series of holes permits adjustment of the length of the supporting connection between the harrow and sustaining-bar to suit different conditions.

I claim any equivalent means of form of combination of means for supporting or carrying the frame in an elevated plane above the ground.

If desired, a draft-tongue $a'$ can be provided, as shown in Fig. 5, carrying the seat and mounted on the axle by braces $a^2$, with its front end loosely coupled to the evener-bar or other part of the front end of the harrow. In such case the two center sustaining-bars can be dispensed with, if desired, and the supporting connections $f\ f$ to the inner sides of the two harrow-sections can be coupled to the tongue, which in this instance is the equivalent of a sustaining-bar. If desired, the center sustaining-bars can be dispensed with and the ends of the center frame-bars extended over the axle to rest thereon when the harrow drops a certain distance relative to the supporting attachment, as shown in a certain pending application; also, if desired, each harrow-section can have an independent axle with two supporting-wheels, as shown in Fig. 4, in which case the seat can be attached to the two inner sustaining-bars the same as shown in Figs. 1 and 2.

The arrangement and location of the wheeled bearing-axle, driver's seat, and the arrangement of the supporting means may be varied or changed without departing from the spirit of my invention.

It should be noted that the tooth-adjusting levers are located within convenient reach of the occupant of the seat of the supporting attachment and that said occupant can easily operate said levers without leaving the seat, and that the operation of adjusting the teeth raises or lowers the harrow, throwing its weight on or from the support, without employing extra levers on the attachment or other means requiring separate and distinct operation to support the harrow.

It should also be noted that I have shown the spring-curved-teeth-adjusting means, although the invention does not relate to the construction of the harrow or its adjusting means, but relates to a supporting attachment which can be applied to any harrow or other cultivating implement for which the attachment is adapted.

It is evident that various changes might be made in the forms, constructions, and arrangements of the parts described without departing from the spirit and scope of my invention. Hence I do not limit my invention to the constructions disclosed herein; but

What I claim, and desire to secure by Letters Patent of the United States, is—

1. A wheeled attachment, and a lever spring-tooth harrow connected and drawn together, in combination with depending and connecting supports between the wheeled attachment and the harrow, whereby the harrow-frame is carried in an elevated horizontal plane and left free to move above the plane of the support when the teeth are in or out of operative engagement with the soil.

2. A wheeled attachment, and a lever spring-tooth harrow composed of separate sections drawn together, in combination with depending and connecting supports on each side of each section connecting the wheeled attachment and the section-frames, for supporting and carrying the section-frames in an elevated plane above the ground, substantially as set forth.

3. A wheeled attachment, and a lever-harrow connected and drawn together, in combination with depending and connecting supports from the wheeled attachment having eccentric connection with the harrow-frame for supporting the harrow-frame in different horizontal planes above the ground, when the teeth are out of or in operative engagement with the soil.

4. A lever-harrow composed of sections with depending shoes, in combination with a wheeled attachment having an elevated driver's seat, and draft-tongue connected to the draft of the harrow, depending connecting supports between the draft-tongue and each section of the harrow for supporting and carrying the frame in an elevated plane above the ground.

5. A wheeled attachment, and a lever spring-tooth harrow with depending shoes, the harrow and wheeled attachment connected and drawn together, in combination with depending supports between the wheeled attachment and a composite member of the harrow-frame, whereby the harrow-frame is carried in an elevated horizontal plane and left free to move above the plane of the support when the teeth are in or out of operative engagement with the soil.

In testimony whereof I affix my signature in presence of two witnesses.

EFFINGER E. WHIPPLE.

Witnesses:
FENNIMORE WHIPPLE,
HANNAH M. WHIPPLE.